Nov. 12, 1968     M. MERNA, JR     3,410,153

CAM ACTUATED LOCKING DEVICE

Filed June 7, 1967     2 Sheets-Sheet 1

INVENTOR.
MICHAEL MERNA, JR.
BY
WILSON, SETTLE & BATCHELDER.
ATT'YS.

United States Patent Office 3,410,153
Patented Nov. 12, 1968

3,410,153
CAM ACTUATED LOCKING DEVICE
Michael Merna, Jr., 24901 Carlysle,
Dearborn, Mich. 48124
Filed June 7, 1967, Ser. No. 644,144
12 Claims. (Cl. 74—530)

ABSTRACT OF THE DISCLOSURE

The locking device includes a first member having a first circular opening and a rotary member rotatable in the opening and also laterally movable in the opening. The rotary member has a second circular opening in which a cam is provided, and there may be a shaft connected to the cam and a flexible belt wound on the shaft which may be a seat belt or harness for an automotive vehicle. A gradual pull on the belt will cause the belt to unwind as the shaft and cam rotate causing the rotary member to rotate within the first opening. A sudden yank on the belt causes the device to lock so that the belt cannot unwind. In locking the device, the cam rotates relative to the rotary member and forces the rotary member against the inner perimeter of the first member about the first circular opening, so that the rotary member, cam and shaft are each locked in a stationary position. Unlocking occurs when the pulling force is released and is accomplished by a resilient means which returns the cam to its initial position with respect to the rotary member.

*Background of the invention*

It has been proposed to provide locking devices associated with a belt such as a seat belt or harness provided for an automotive vehicle. Such devices have an unlocked condition in which the seat belt may be unwound from a shaft or reel when there is a gradual pull on the belt such as normally occurs when a driver or passenger simply moves around in his seat. A sudden pull or yank on the belt causes the device to lock so that the belt cannot be unwound, and thus the belt holds the driver or passenger in his seat. Known locking devices of this general type have had too many parts, and in general have been too complicated to facilitate low cost manufacture of the devices by mass production techniques. There has been a need for a simpler device with fewer parts and without critical tolerances which could be manufactured economically.

*Summary of the invention*

It is now proposed to provide a locking device in which a rotary member which is actuated by a cam rotates within an opening in another member so long as a constant or gradual accelerating driving force is applied via the cam to the rotary member. However, when the cam is accelerated suddenly, it forces the rotary member against the wall surrounding the opening in which the rotary member is provided, and this locks the rotary member and the cam in stationary positions. The cam may be driven by a shaft having a flexible belt wound thereon, and as mentioned above, the belt may be the seat belt or harness provided for an automotive vehicle. Thus, by means of only a few simple parts, a locking device is provided which allows the belt to unwind so long as constant or gradually increasing force is applied to it, but which locks the belt against unwinding when a suddenly increasing force is applied to the belt.

Accordingly, it is an object of this invention to provide a simplified locking device consisting of fewer parts than known devices.

Another object of the invention is to provide a locking device wherein the parts of the device generally lie in the same plane, thus making the device unusually compact.

Another object of the invention is to provide a locking device in which a rotary member is actuated by a cam to keep the device unlocked when a constant or gradually increasing force is applied to the cam, and to lock the device when a rapidly increasing force is applied to the cam.

Another object of the invention is to provide a cam actuated locking device including rotary parts which will lock when rotated in a rapidly accelerating manner in either direction of rotation.

Another object of the invention is to provide a cam actuated locking device which, after being locked, will automatically unlock when driving force is released from the device.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
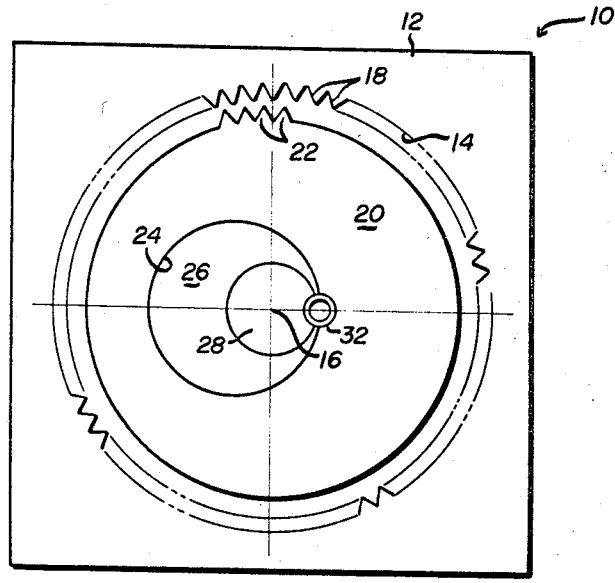
FIGURE 1 is an elevational view of a locking device in accordance with one embodiment of the invention.
Figure 2:
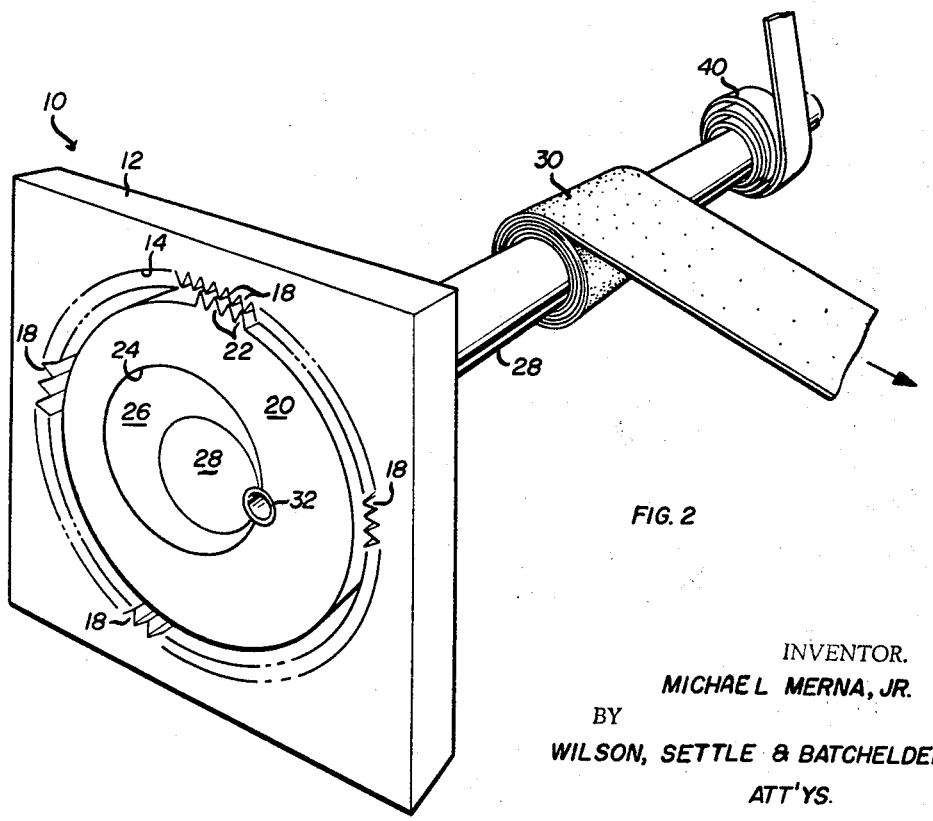
FIGURE 2 is a perspective view of the locking device of FIGURE 1 and shows somewhat schematically a belt wound on a shaft of the device.

As shown on the drawings:

The locking device 10 shown in the drawings includes a first member 12 having a circular opening 14 therein about an axis 16. The member 12 may be a plate, a housing, a wall or any other structure which can be provided with the circular opening 14, and the member 12 is shown in the drawings as being in the form of a plate by way of example. The opening 14 need not extend all the way through the plate 12, and it may be in the form of a recess in plate 12 if desired. In FIGURES 1 and 2, the inner perimeter of the plate 12 surrounding the opening 14 is provided with teeth 18 which serve a locking function, and will be described, but as shown in FIGURES 3 through 6, the teeth 18 may be omitted where friction locking is relied on.

Inside the opening 14, there is a circular rotary member 20 which is coaxial with the opening 14, and which is rotatable within opening 14 and also movable laterally within opening 14. The rotary member 20 may be provided with teeth 22 at its outer perimeter to cooperate with the teeth 18 of plate 12, but in cases where the teeth 18 are omitted, the teeth 22 on member 20 may also be omitted. It may be noted that the teeth 22 need no extend all the way around the perimeter of member 20, and only four teeth 22 are shown in FIGURES 1 and 2 by way of example. The outside diameter of rotary member 20 is sufficiently smaller than the inside diameter of plate 12 about opening 14 to allow the rotary member 20 to rotate freely within the circular opening 14. The spacing between plate 12 and rotary member 20 is sufficiently small so that a slight lateral shifting of the rotary member 20 will bring its outer perimeter into contact with the inner perimeter of plate 12 about opening 14. Where teeth 18 and 22 are provided, they will be brought into meshing engagement by lateral movement of the rotary member 20.

The rotary member 20 has a circular opening 24 therein located eccentrically with respect to the axis 16. Opening 24 need not extend all the way through member 24. Inside opening 24 is a circular cam 26 which is also located eccentrically with respect to the axis 16. The cam 26 has a sliding fit with the inner perimeter of rotary member 20 about opening 24, and the eccentric cam 26 is movable about the axis 16.

A driving means is provided to move the cam 26 about axis 16, and this driving means may take the form of a shaft 28 which is integral with the cam member 26 and coaxial with the opening 14. Thus, shaft 28 is adapted to rotate about axis 16 to move the cam 26 about axis 16 in an eccentric manner.

As previously mentioned, the locking device 10 may be used to control winding and unwinding of a belt such as a seat belt or harness in an automotive vehicle. In such an application, a belt 30 may be connected to and wound about the shaft 28 as shown in FIGURE 2. The overall purpose of the locking device 10 in this application is to allow unwinding of the belt 30 when the belt is pulled at constant speed or gradually increasing speed in the direction of the arrow in FIGURE 2. However, if a sudden pull or yank is applied to the belt 30 in the direction of the arrow, the device 10 locks to hold the shaft 28 and the belt 30 in stationary positions so that the belt cannot be unwound further. It will be understood, however, that the device 10 could be used to lock other devices connected to the shaft 28.

Figure 3:
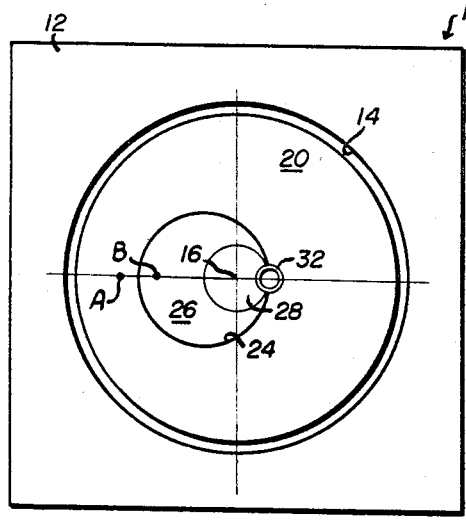
FIGURE 3 is an elevational view of a locking device forming another embodiment and showing a cam of the device in an initial position with respect to a rotary member of the device.

The initial position of the cam 26 with respect to the rotary member 20 is shown in FIGURES 1, 2, 3 and 4. If the cam 26 is moved relative to the rotary member 20, there must be some means to return the cam to its initial position. This may be accomplished by providing a resilient member connected between cam 26 and rotary member 20. In FIGURES 1, 2, and 3, the resilient connection is a small rubber tube 32 which is received in opposing recesses in the cam 26 (or shaft 28) and the rotary member 20 so that the tube 32 provides a yieldable resilient coupling between the cam member 26 and the rotary member 20. If the cam 26 is moved relative to the rotary member 20, the rubber tube 32 is distorted in the manner shown in FIGURES 5 and 6. Then, when driving force is removed from shaft 28 and cam 26, the tube 32, being resilient, will return the cam 26 to its initial position relative to the rotary member 20.

Figure 4:
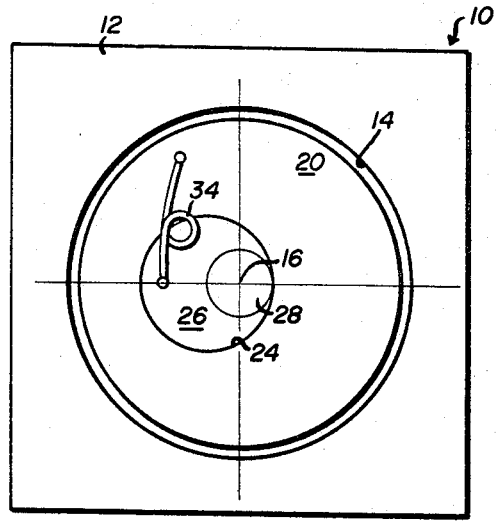
FIGURE 4 is an elevational view of a modification of the locking device of FIGURE 3.

FIGURE 4 shows a modification of the locking device in which the resilient connection between cam member 26 and rotary member 20 is provided by a wire-loop spring 34 having one end connected to cam 26 and the other end connected to rotary member 20. The spring 34 serves the same function as the rubber tube 32; that is, to return the cam member 26 to its initial position relative to rotary member 20 after the cam member has been moved relative to rotary member 20.

Figure 5:
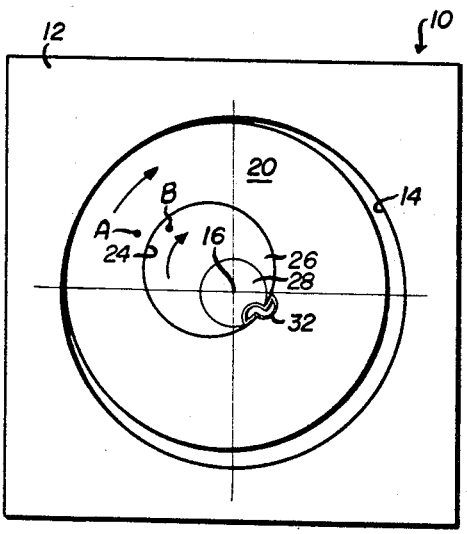
FIGURE 5 is an elevational view of the locking device of FIGURE 3 showing a cam advanced ahead of a rotary member of the locking device to lock the device when the cam is rotated in the clockwise direction.
Figure 6:
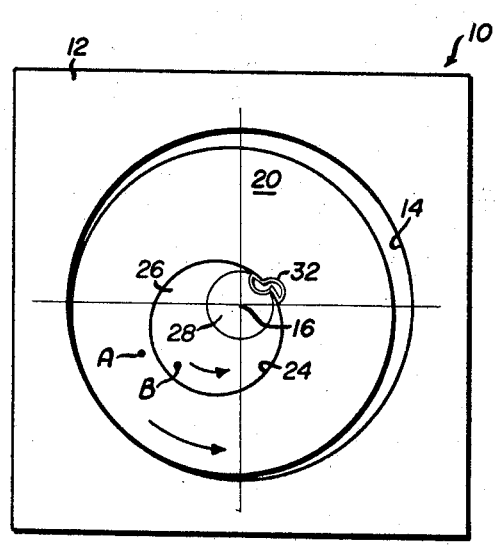
FIGURE 6 is an elevational view of the locking device showing the cam advanced ahead of the rotary member to lock the device when the cam is rotated in the counter-clockwise direction.

The operation of the locking device 10 is illustrated by comparison of FIGURES 3, 5 and 6. In FIGURES 3, the cam 26 is in its initial or rest position with respect to the rotary member 20. This position is indicated in FIGURE 3 by two dots A and B, one on cam 26 and the other on rotary member 20, the dots being directly opposite each other when cam 26 is in its initial position. If a gradually increasing pull is exerted on belt 30 to rotate shaft 28 in a gradually accelerating or constant speed manner, the cam 26 will rotate eccentrically about axis 16 and will drive rotary member 20 so that it rotates also about axis 16. In this situation, the cam 26 does not move relative to rotary member 20, and the two dots A and B will stay lined up in the manner shown in FIGURE 3.

If, however, the belt 30 is pulled or yanked so as to rapidly accelerate shaft 28, the cam 26 will rotate in a clockwise direction as indicated by an arrow in FIGURE 5, and will advance ahead of the rotary member 20 as indicated by the separated dots A and B on members 26 and 20 in FIGURE 5. When cam 26 advances relative to rotary member 20, the rotary member 20 is forced laterally into engagement with the inner perimeter of plate 12 about opening 14. Once cam 26 and rotary member 20 are engaged, the rotary member 20, the cam 26 and the shaft 28 are locked together and cannot be turned further. This stops the unwinding of belt 30 from shaft 28.

The device 10 will stay in this locked condition as long as pulling force is applied to the belt 30. It may be noted in FIGURE 5 that the rubber tube 32 has been distorted due to the movement of cam 26 relative to the rotary member 20. When pulling force is released from the belt 30, the resilient rubber tube 32 urges the cam 26 and the rotary member 20 back to their initial relative positions wherein the dots are lined up with each other, and consequently the rotary member 20 is disengaged from the plate 12.

If the belt were wound about the shaft 28 in the opposite direction from that shown in FIGURE 2, a pull on the belt 30 would cause the cam 26 to rotate in the counter-clockwise direction as shown in FIGURE 6. A sudden yank on the belt 30 causes the cam 26 and the shaft 28 to rapidly accelerate so that the cam 26 advances in the counter-clockwise direction relative to rotary member 20. This advancement is indicated by the separated dots A and B on members 26 and 20 in FIGURE 6. The cam 26 forces the rotary member 20 into engagement with the inner perimeter of plate 12 about opening 14 and again locks rotary member 20, cam 26 and shaft 28 in a stationary position so that the belt 30 cannot be unwound further so long as force is applied to it. When the belt 30 is released, the resilient tube 32 urges cam 26 and rotary member 20 back to their initial relative positions wherein the dots A and B are aligned, and the device is then ready for further operation. It may be noted that resilient tube 32 does not return rotary member 20 and cam 26 back to their initial positions with respect to plate 12 but does return them to their initial positions relative to each other.

Where teeth 18 and 22 are provided on the rotary member 20, these teeth will be brought into meshing engagement when the rotary member 20 is forced outwardly by the advancing cam 26, and this provides a positive engagement between members 26 and 20. However, a friction locking action such as illustrated in FIGURES 5 and 6 where no teeth are provided on members 26 and 20 is sufficient for the purpose of locking the device.

It may be noted that a rewind spring may be connected to the shaft 28, as indicated schematically by the spring 40 in FIGURE 2, and this spring will cause the shaft 28 to rotate to rewind the belt 30 on shaft 28 after it has been unwound in the manner described above. With this arrangement, the device 10 may be made to lock if the force of the rewind spring 40 is applied suddenly to the shaft 28 by suddenly releasing the belt 30. For instance, if the device has been locked so that the parts are in the locked condition illustrated in FIGURE 5 by virtue of a suddenly increasing pull on belt 30, the device may be unlocked and the belt 30 rewound by gradually releasing the pull on the belt 30 so that the spring 40 gradually rewinds the belt 30 on shaft 28. If, however, the belt 30 were released very suddenly, the force of spring 40 would be applied suddenly to shaft 28, and this would cause the device to relock in the opposite direction as shown in FIGURE 6. Thus, the device may be made to lock in either direction of rotation of the shaft 28.

The device 10 has only a few simple parts, and it may be seen, for example in FIGURE 2, that the parts are located mostly in the plane of plate 12 so that a very compact structure is provided. The device may be made as large as needed, but it also could be made very small, for example, about the size of a quarter, and this could be quite important in some applications. The device can be manufactured economically and can be installed conveniently in vehicles when used for seat belt or harness applications.

Having thus described my invention, I claim:

1. A cam actuated locking device comprising first means having a first circular opening therein about an axis, a rotary member located in said opening and rotatable about said axis, said rotary member having a second circular opening therein located eccentrically relative to said axis, an eccentric cam in said second circular opening and displaceable about said axis, said cam having an initial position with respect to said rotary member, driving means operatively connected to said cam for moving said cam about said axis to rotate said rotary member within said first circular opening, said cam being movable relative to said rotary member upon sudden acceleration of said cam by said driving means to force said rotary member against the inner perimeter of said first means about said first opening to lock said cam and said driving means in a stationary condition, and resilient means connected between said cam and said rotary member to restore said cam and said rotary member to their initial positions relative to each other upon removal of driving force from said cam to thereby release said rotary member from said first means.

2. The locking device as claimed in claim 1 in which said driving means includes a shaft rotatable about said axis.

3. The locking device as claimed in claim 2 in which said shaft is integral with said cam.

4. The locking device as claimed in claim 2 in which said driving means further includes flexible means connected to and wound about said shaft so that said flexible means may be pulled to rotate said shaft for unwinding said flexible means and a sudden pull on said flexible means locks said device.

5. The locking device as claimed in claim 4 in which said flexible means comprises a belt.

6. The locking device as claimed in claim 1 in which said rotary member is circular and has an outside diameter smaller than the inside diameter of said first circular opening.

7. The locking device as claimed in claim 6 in which said cam is circular and has a sliding fit with the inner perimeter of said rotary member about said second circular opening.

8. The locking device as claimed in claim 1 in which the inner perimeter of said first means about said first circular opening has teeth thereon and said rotary member has teeth engageable with those of said first means in he locking condition of said device.

9. The locking device as claimed in claim 1 in which said resilient means comprises a resilient tube interposed between said cam member and said rotary member, said cam member and said rotary member being recessed to receive said tube therebetween.

10. The locking device as claimed in claim 1 in which said resilient means comprises a spring.

11. A cam actuated locking device comprising a cam located eccentrically with respect to an axis and movable about said axis, a rotary member rotatable about said axis and movable laterally of said axis, said rotary member having a first opening therein receiving said cam and located eccentrically with respect to said axis, and said cam and said rotary member having an initial position with respect to each other stationary means having a second opening therein concentric with said axis and receiving said rotary member therein, driving means operatively connected to said cam for moving said cam about said axis to rotate said rotary member within said second opening, said cam being movable relative to said rotary member upon sudden acceleration of said cam by said driving means to force said rotary member against the inner perimeter of said stationary means about said second opening to lock said cam and said driving means in a stationary condition, and means connected between said cam and said rotary member to return said cam and said rotary member to said initial position upon removal of driving force from said cam to thereby release said rotary member from said stationary means.

12. A cam actuated locking device comprising first means having a first circular opening therein about an axis, a circular rotary member located in said first opening and coaxial therewith, said rotary member having a second circular opening therein located eccentrically relative to said axis, an eccentric cam in said second circular opening having a sliding fit therewith and movable about said axis, said cam and said rotary member having an initial position with respect to each other, a shaft connected to said cam and coaxial with said axis, said shaft being rotatable to move said cam about said axis and thereby rotate said rotary member in said first opening, flexible means connected to and wound about said shaft so that said flexible means may be pulled to rotate said shaft for unwinding said flexible means, a sudden pull on said flexible means being effective to suddenly accelerate said shaft and said cam to thereby move said cam relative to said rotary member and thus force said rotary member against the inner perimeter of said first means about said first circular opening to lock said cam and shaft in a stationary condition, and resilient means connected between said cam and said rotary member to restore said cam and said rotary member to said initial position upon removal of driving force from said cam to thereby release said rotary member from said first means.

References Cited

UNITED STATES PATENTS

| | | | |
|---|---|---|---|
| 2,953,315 | 9/1960 | Lautier et al. | 297—386 X |
| 3,077,324 | 2/1963 | Strickland | 297—385 X |
| 3,190,579 | 6/1965 | Spouge et al. | |
| 3,237,729 | 3/1966 | Proctor | 297—386 X |
| 3,332,720 | 7/1967 | Hansen | 297—385 |

DONLEY J. STOCKING, *Primary Examiner.*

L. H. GERIN, *Assistant Examiner.*